United States Patent Office 2,733,525
Patented Feb. 7, 1956

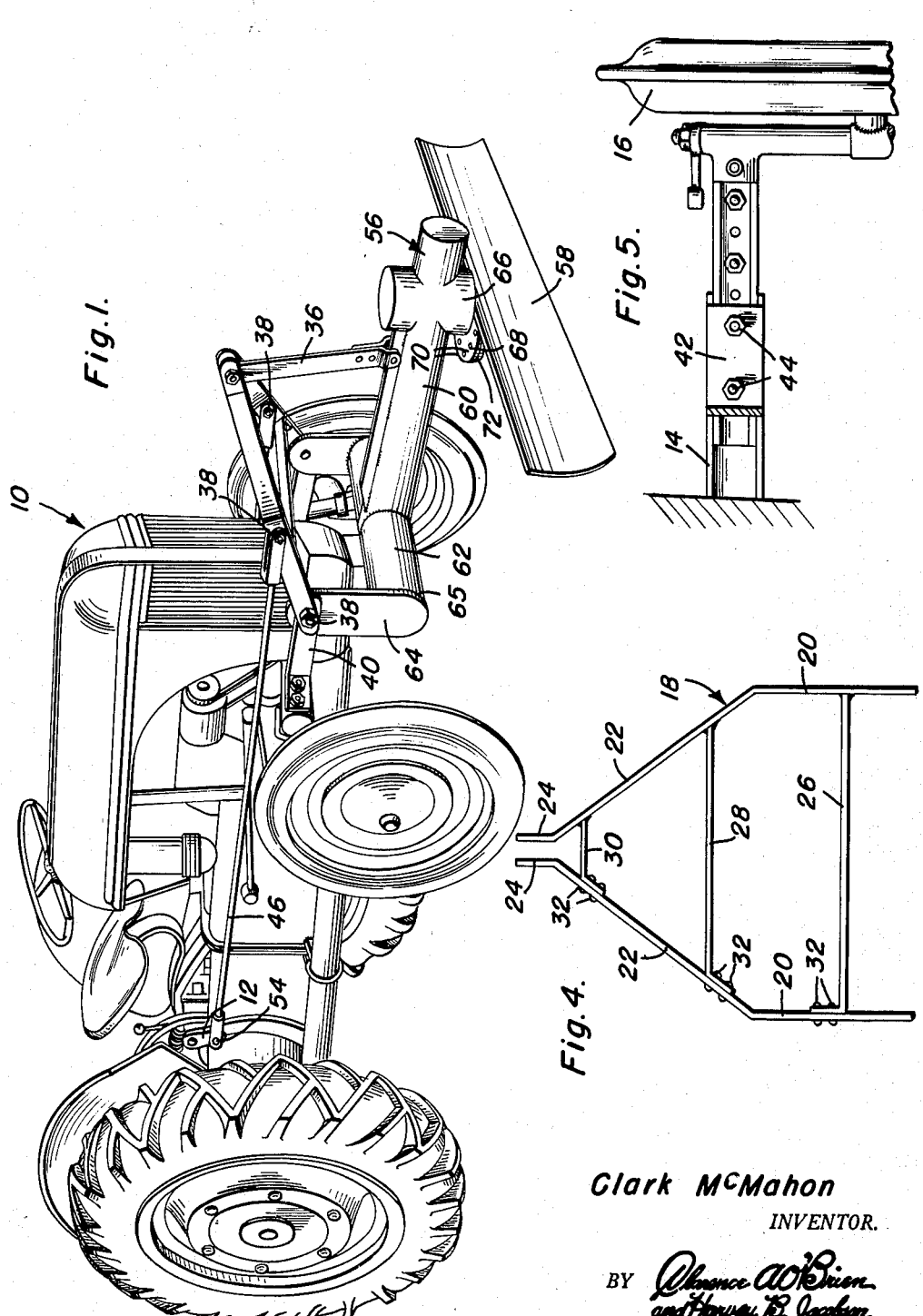

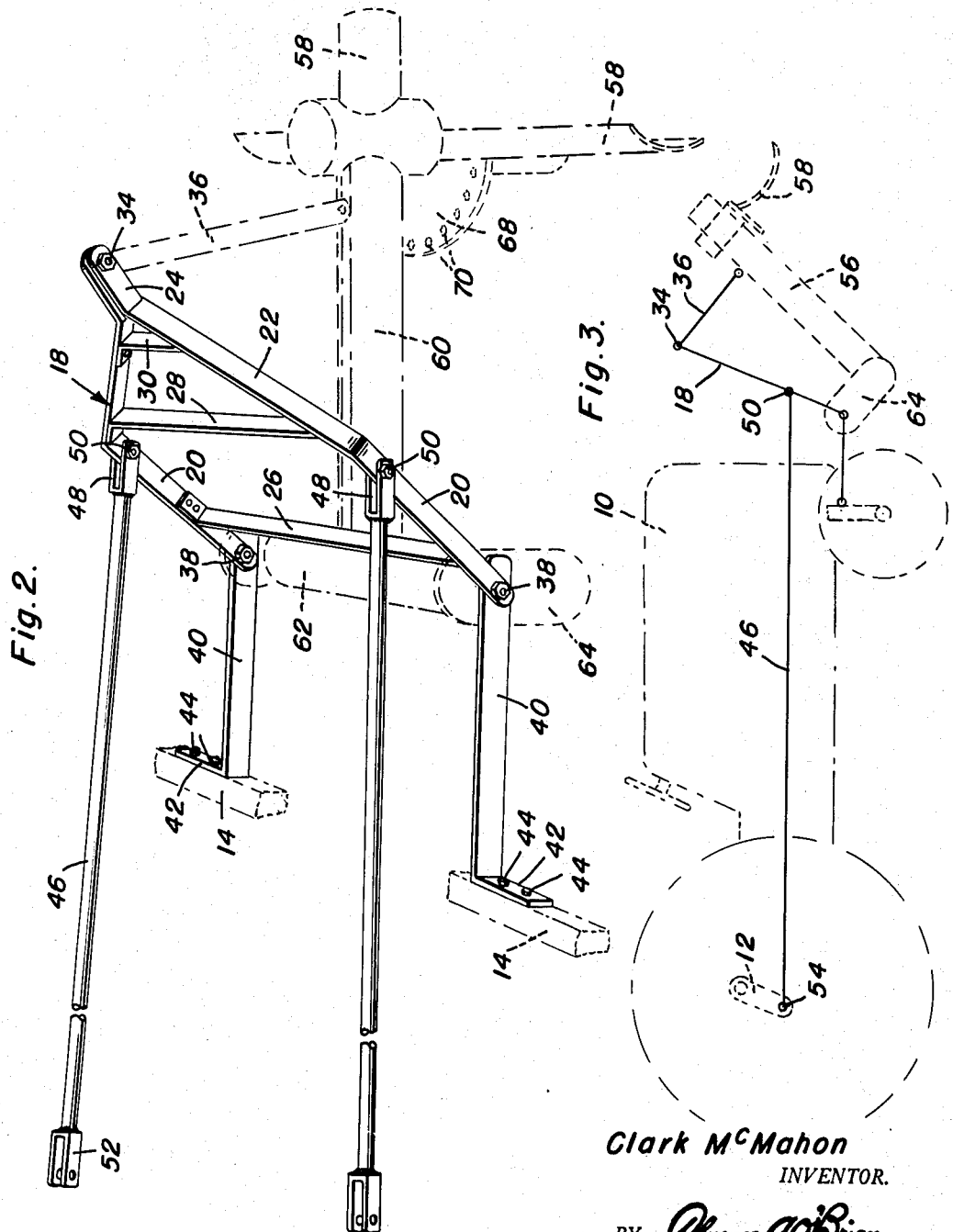

2,733,525

BLADE ATTACHMENT FOR TRACTORS

Clark McMahon, Red Cloud, Nebr.

Application April 7, 1952, Serial No. 280,900

1 Claim. (Cl. 37—144)

This invention comprises novel and useful improvements in a blade attachment for tractors and more specifically pertains to an attachment for adjustably mounting and supporting a conventional blade which is the type customarily mounted upon the rear of tractors upon the front end thereof for operation by the power mechanism of the tractor.

The primary object of this invention is to provide an attachment which shall be of a very simple construction, easily and readily attached to a conventional tractor and adapted to be operated by the power mechanism and particularly the hydraulic power take-off of the tractor; which may be readily adjusted for properly positioning a scraper blade or the like upon a tractor; and which shall be adapted specifically to accommodate a conventional form of blade customarily mounted upon the rear of a tractor.

These, together with various ancillary features and objects of the invention, which will later become apparent as the following description proceeds, are attained by the present invention, a preferred embodiment of which has been illustrated, by way of example only, in the accompanying drawings, wherein:

Figure 1 is a perspective view showing a conventional form of tractor with the attachment in accordance with this invention applied thereto;

Figure 2 is a perspective view of a part of the supporting frame of the attachment, parts of the tractor and parts of the attachment being shown in dotted lines therein;

Figure 3 is a diagrammatic side elevational view of the attachment showing the manner in which the same is applied and positioned upon a tractor, with the attachment being shown in its raised position;

Figure 4 is a plan view of a carriage element forming a part of the attachment; and Figure 5 is a fragmentary detail view taken in vertical section from the front of the tractor and showing the manner in which the supporting brackets are attached to the frame of the tractor.

Referring now more specifically to the accompanying drawings, wherein like numerals designate similar parts throughout the various views, it will be seen that the numeral 10 indicates generally a conventional form of farm tractor, the same being provided with the customary hydraulic power take-off, not shown, but to which are applied lever or crank arms 12 which are pivoted or oscillated by the hydraulic power take-off in a conventional manner, not shown, but well understood by those skilled in the art. In addition, the conventional tractor, includes front frame members 14 to which the front wheels 16 are customarily attached, see Figures 2 and 5, and to the above mentioned parts the attachment in accordance with this invention is applied.

The attachment itself consists of a carriage, see Figures 2 and 4, which carriage indicated generally by the numeral 18 includes a pair of side members 20, which at their rear or inward ends are disposed in parallel relation to each other, and at their forward or outer ends have convergent portions 22 which terminate in parallel extremities 24. The side members are rigidly attached to each other by suitable cross members or braces such as those shown at 26, 28 and 30, one end of the cross brace members being welded or otherwise secured to one of the side frame members, and the other ends of the cross braces having angulated portions which are secured as by rivets, bolts or the like 32 to the other side member. By this means, a rigid carriage is provided, and to the apex of the carriage and between the two terminal portions 24, there is pivotally secured as by a pivot bolt 34, a link member 36 for a purpose which will be subsequently set forth.

The rearward ends of the carriage are pivotally attached as at 38 to the outer ends of a pair of supporting brackets 40 which have angularly and outwardly turned rear flanges or ends 42 detachably secured to the frame 14 as by bolts 44. It will thus be seen that the rearward ends of the carriage are pivotally mounted upon brackets carried by the frame of the tractor whereby the carriage is pivotal vertically as set forth hereinafter.

A pair of connecting rods 46 are provided having forked extremities 48 which are pivotally connected as by bolts 50 to the side frame members 20 intermediate the ends of the latter, and at their other ends are provided with forks 52 which are pivotally connected as by bolts 54 to the ends of the power operating cranks or levers 12. It will thus be apparent that when the hydraulic power take-off of the tractor is actuated, the levers 12 will be rocked and through the connecting rods 46 will cause vertical pivoting movement of the carriage 18 about its pivot pins 38.

Operatively connected to the carriage and the supporting brackets is a lifter indicated generally by the numeral 56 and which has a blade 58 carried thereby. This lifter is preferably T-shaped, having a stem portion 60 and a cross arm 62, the latter having welded to its ends hanger plates 64 which are welded thereto as at 65 and which at their upper ends are pivotally connected to the support brackets 40 by the above mentioned pivot members 38 to suspend said lifter 56 from said pivot members 38 in underslung relation to said pivot members.

The lower end of the link 36 is pivotally connected to the stem 60 of the lifter 56 whereby the latter will be vertically pivoted in response to pivoting movement of the carriage, as above described.

Adjacent its outer end, the stem 60 of the cross arm 56 is provided with a depending cylindrical projection 66 having an annular flange 68 rigidly formed thereon, which annular flange is provided with a plurality of circularly arranged adjustable fastening apertures 70.

The blade 58 at its mid-portion is provided with a complementary arcuately shaped flange or plate 72 which is likewise apertured for selective registry with the aperture 70 whereby the blade may be disposed in a predetermined angular relationship with respect to the lift arm.

The blade, or the blade, lifter 56 and link may be of a conventional and well-known design which is customarily attached to the rear end of a tractor for operation thereby. By this attachment, the blade may be positioned and mounted upon the front end of the tractor, may be controlled by the hydraulic power take-off of the tractor, and may be readily adjusted both as to angling with respect to the front of the tractor, or vertically in order to vary the depth of cut of the blade.

As will be manifest, by virtue of the hanger plates 64, the lifter 60 may be lowered into underslung position relative to the pivot members 38 so that resistance to forward movement of the blade 58 will tend to swing said lifter downwardly to maintain the blade engaged with the ground in scraping position.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

Having described the invention, what is claimed as new is:

A blade attachment for a tractor having a pair of side power operated levers and a front frame member, said attachment comprising a lift frame having side members, a pair of brackets attachable to said front frame member, pivots connecting said side members to said brackets for vertical swinging of said lift frame on said brackets, a lifter comprising a stem and a rear cross arm, hanger plates fixed on the ends of said cross arm and pivoted on said pivots so that said lifter is vertically swingable in underslung position relative to said pivots, a ground scraping blade on said stem, connecting rods pivoted to said side members and pivotally attachable to said levers for swinging said lift frame vertically by operation of said levers, and a link operatively connecting said lift frame to said stem for vertical swinging of said lifter by said lift frame.

References Cited in the file of this patent

UNITED STATES PATENTS

| | | |
|---|---|---|
| 2,368,156 | Orelind et al. | Jan. 30, 1945 |
| 2,443,884 | Arps | June 22, 1948 |
| 2,564,355 | Danuser | Aug. 14, 1951 |
| 2,600,244 | Harper | June 10, 1952 |
| 2,608,924 | Bywater et al. | Sept. 2, 1952 |
| 2,629,946 | Ewers et al. | Mar. 3, 1953 |